July 20, 1943.  V. M. BERGEN  2,324,670

MILK CONTAINER

Filed Aug. 3, 1939

INVENTOR.
Von M. Bergen
BY Carlos G. Stratton
ATTORNEY.

Patented July 20, 1943

2,324,670

UNITED STATES PATENT OFFICE 2,324,670

MILK CONTAINER

Von M. Bergen, Huntington Park, Calif.

Application August 3, 1939, Serial No. 288,079

1 Claim. (Cl. 229—7)

My invention relates to milk containers and more particularly to a container having flexible sides, such as a waxed paper container.

The principal object of the invention is to provide means in a flexible milk container for separating the cream and milk therein, whereby the cream may be poured off without the milk in the container mixing therewith.

The invention also comprises novel details of construction and novel combinations and arrangements of parts, which will more fully appear in the course of the following description.

In the drawing, like reference characters designate similar parts in the several views.

Figure 1:
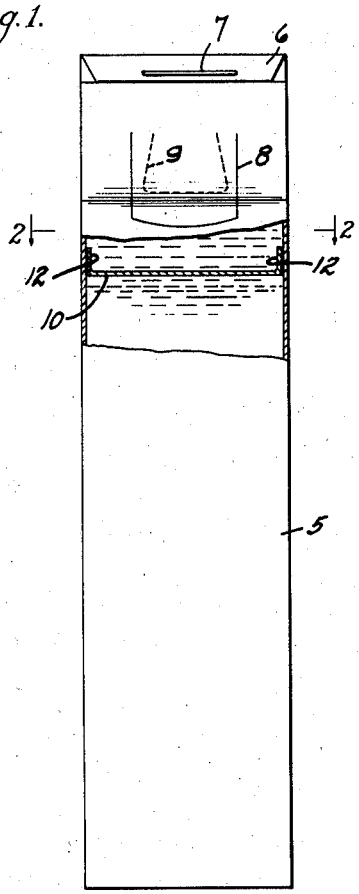
Figure 1 is a broken elevation of one form of the present invention.

Referring more in detail to the drawing, the reference numeral 5 indicates the body of a waxed paper container that is folded together at the top as shown at 6 and fastened together by means of a clamp 7. A flap 8 closes an opening 9 in an inner layer of the material of the container. Thus far is conventional construction well known to those skilled in the art, so that it is believed that further illustration and description are unnecessary.

A partition 10 is disposed horizontally in the container 5. Flanges 12 are bent at an angle to the partition 10 and are fastened to the sides of the interior of the container 5. This fastening may be effected by wax or other suitable means. It is preferred to have the partition 10 and its flanges of waxed paper similar to the body of the container 5, although other materials that will not contaminate milk may be used.

The partition 10 has inwardly curved edges 13 that are spaced from the wall of the container 5 to provide passages 14 between the upper and lower portions of the container 5, provided by the partition 10.

Figure 3:
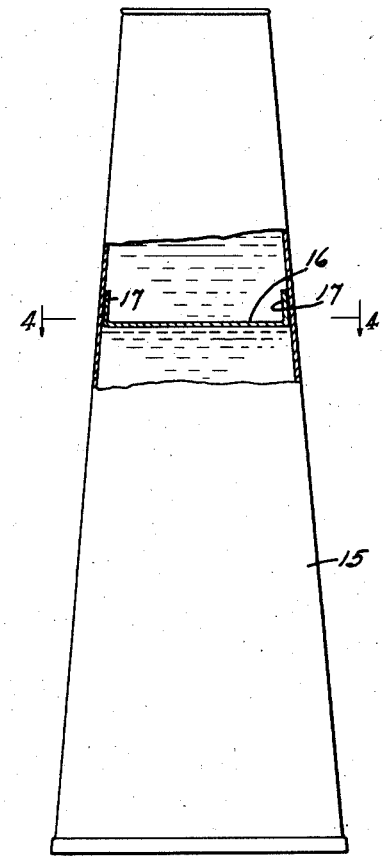
Figure 3 is a broken elevation of another form of the present invention.
Figure 4:
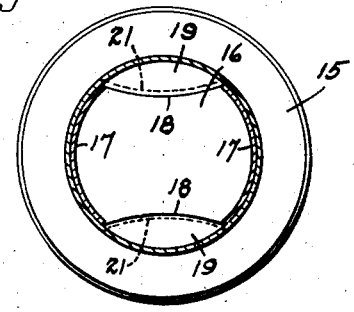
Figure 4 is a section taken on the line 4—4 of Figure 3.

In the form shown in Figures 3 and 4, the container 15 is in the shape of a truncated cone. The partition 16 is provided with flanges 17 that are fastened to the inner surface of the body 15. The edges of the partition 16 are cut to provide passages 19 between the curved edges 18 and the inner surface of the body 15. The top of the container 15 is open and is closed by a conventional milk bottle cap. This closing means is well known in the art, hence further drawings and description are believed unnecessary of same.

In the use of either form of the present invention, milk is poured into the container and the cream is allowed to rise to the top of the milk within the container.

The partitions 10 and 16 are preferably placed slightly above the normal cream level (i. e. the top of the milk), such as approximately one-eighth (⅛) of an inch above the cream level. The position of the partition may, of course, be adjusted depending upon the quantity of butterfat in the milk that is placed in the container.

Figure 2:
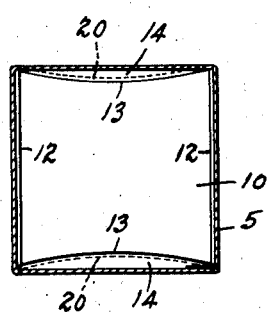
Figure 2 is a section taken on the line 2—2 of Figure 1.

Thus after the cream has risen to the top of the milk, most of it will be above the partition. In order to pour off this cream, all that is necessary is to pinch together the wall of the container, to bend the wall inward to close the passages 14 or 19, depending upon the form used. In the form shown in Figures 1 and 2, the portions of the wall opposite the curved edges 13 are bent inward, as indicated by the broken lines 20 in Figure 2. In the form shown in Figures 3 and 4, opposite portions of the wall of the container 15 are bent inward against the curved edges 18, as indicated by the broken lines 21 in Figure 4.

When the passages 14 and 19 are thus closed, the cream above the partitions may be poured off without the milk below the partitions mixing with the cream. The cream thus poured off is even of sufficient richness to be whipped.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications which may fall within the scope of the appended claim.

Having thus described my invention, what I claim and desire to secure by Letters Patent is:

A device of the class described comprising vertical side walls providing a container of substantially squared cross-section having corner portions, a substantially horizontal division wall mounted between said side walls and dividing the container interior into an upper and a lower chamber, said division wall having an inwardly uniformly curved edge portion normally spaced from an adjacent side wall, said curved portion extending from substantially one corner portion to the opposite corner portion to provide an elongated communication opening between said chambers, the degree of curvature being such that the side wall portion adjacent said inwardly curved portion is sufficiently flexible to be inwardly compressed into contact with said inwardly curved edge portion to seal said opening.

VON M. BERGEN.